United States Patent [19]

Vander Meiden

[11] Patent Number: 4,512,026
[45] Date of Patent: Apr. 16, 1985

[54] DATA FORMAT FOR ASYNCHRONOUS DATA TRANSMISSION

[75] Inventor: Orrie J. Vander Meiden, Boca Raton, Fla.

[73] Assignee: Siemens Corporate Research & Support, Inc., Iselin, N.J.

[21] Appl. No.: 487,423

[22] Filed: Apr. 21, 1983

[51] Int. Cl.³ .................... H04L 25/38; H04L 7/08
[52] U.S. Cl. .................... 375/114; 375/117; 370/48; 370/100
[58] Field of Search .................... 375/114, 116, 117; 370/43, 48, 99, 100; 340/825.14

[56] References Cited

U.S. PATENT DOCUMENTS

| | | | |
|---|---|---|---|
| 3,710,056 | 1/1973 | Tomozawa | 370/99 |
| 4,049,908 | 9/1977 | Knorpp et al. | 178/58 R |
| 4,161,719 | 7/1979 | Parikh et al. | 375/114 |
| 4,298,978 | 11/1981 | Nakamura | 370/48 |

*Primary Examiner*—Benedict V. Safourek
*Attorney, Agent, or Firm*—Karl F. Milde, Jr.

[57] ABSTRACT

This invention relates to a method and apparatus for transmitting digital data between data terminals via a telecommunications exchange. Data is transmitted asynchronously between the terminals and the exchange and synchronously within the exchange. Transmitted data and internal exchange signals are differentiated even when they are identical. This is accomplished by using a data frame comprising both an information code and a control code which indicates whether the information code contains data to be transmitted. If the transmitted data is not identical to specific digital codes reserved for internal processing in the exchange, the control code is set to one state and the information code contains the data to be transmitted. If the data is identical to one of the digital codes reserved for the exchange, the control code is set to a second state and prescribed substitute digital data is inserted in the information code portion of the data frame.

3 Claims, 7 Drawing Figures

DATA FORMAT FOR ASYNCHRONOUS DATA TRANSMISSION

BACKGROUND OF THE INVENTION

This invention relates to the transmission of asynchronous digital data between computer terminals via a telecommunications exchange.

A telecommunications exchange, such as a telephone switch used in a private automatic branch exchange, may reserve particular bytes of digital data for internal operations. Therefore, when a terminal transmits a character through the switch which is represented by a digital byte that is identical to a reserved byte the switch will be unable to differentiate between the transmitted character and the reserved byte.

SUMMARY OF THE INVENTION

It is accordingly an object of the present invention to provide a method of transmitting bytes of digital data through a telecommunications exchange which may be identical to bytes used internally by the exchange.

It is a further object of the present invention to provide a method of framing digital data transmitted to an exchange so that the exchange can differentiate between bytes contained in the data frame.

It a further object of the present invention to provide a method of framing digital data transmitted to an exchange so that the exchange can differentiate between types of information contained in a particular byte in the data frame.

It is a further object of the present invention to provide apparatus for transmitting bytes of digital data through a telecommunications exchange which may be identical to bytes used internally by the exchange.

It is a further object of the present invention to provide apparatus for framing digital data transmitted to an exchange so that the exchange can differentiate between bytes contained in the data frame.

It is a further object of the present invention to provide apparatus for framing digital data transmitted to an exchange so that the exchange can differentiate between types of information contained in a particular byte in the data frame.

In general the invention features, in one aspect, a method of transmitting digital data between terminals with a telecommunications exchange, including the steps of converting character information to be transmitted into digital data contained in an information byte, forming a data frame containing the information byte and transmitting the data frame between the terminal and the exchange. The data frame includes a first start bit which indicates the beginning of the data frame, signalling data which indictes terminal status, a control bit which indicates if the frame includes character information in the information byte, a first set of stop bits having at least two stop bits which indicate the end of the sigalling data and the control data, a second start bit which indicates the beginning of the information byte, and a second set of stop bits having at least three stop bits which indicate the end of the data frame and which have a different number of stop bits than the first set.

In preferred embodiments, the invention features a method of creating a data frame of 24 bits; the method of creating signalling data wherein the data includes a signalling byte containing 7 bits of data; the method of providing a control bit wherein the control bit is a 1 when the information byte contains character information, and the control bit is a 0 when the information byte does not contain character information; the method of providing a control bit wherein the information byte contains additional status information when the control bit is a 0; the method of creating a data frame having a first start bit indicating the beginning of the frame; a signalling byte having seven bits of data which define the status of the terminal; a control bit indicating the content of the information byte; a first set of stop bits, having two stop bits which define the end of the signalling byte and the control bit in the frame; a second start bit indicating the beginning of the information byte; and a second set of stop bits having four stop bits which define the end of the data frame.

In preferred embodiments, the telecommunications exchange reserves specific digital codes for internal processing, detects when the digital data is identical to the digital code reserved by the exchange for internal processing, converts the identical digital data to substitute data, transmitts the substitute data to the exchange in place of the identical digital data, and converts the substitute data transmitted by the exchange to the identical digital data; a predetermined value of the control bit is transmitted with a predetermined information byte whenever the digital data transmitted is identical to the synchronizing data; the predetermined value of the control bit is 0 and the predetermined value of the information byte is 1 0 1 1 1 1 1 1.

In another aspect, the invention features a method of transmitting digital data between terminals with a telecommunications exchange which reserves specific digital codes for internal processing, including the steps of detecting when the digital data is identical to the digital code reserved by the exchange for internal processing; converting the identical digital data to substitute data; transmitting the substitute data to the exchange in place of the identical digital data; and converting the substitute data transmitted by the exchange to the identical digital data.

In the preferred embodiments, the exchange uses internal synchronizing data, and converts the digital data to substitute data whenever the digital data is identical with the synchronizing data; synchronizing data is represented by 1 0 0 0 0 0 0 0.

In another aspect, the invention features apparatus for transmitting digital data between terminals with a telecommunications exchange, having means for converting character information into digital data contained in an information byte, means for forming a data frame containing the information byte and means for transmitting the data frame between the terminal and the exchange. The means for forming a data frame includes means for generating a first start bit responsive to the beginning of the data frame, means for generating signalling data responsive to terminal status, means for generating a control bit responsive to the content of the information byte, means for generating a first set of stop bits having at least two stop bits and responsive to the end of the signalling data, means for generating a second start bit responsive to the beginning of the information byte and means for generating a second set of stop bits having a different number of stop bits than the first set and responsive to the end of the data frame.

In preferred embodiments, the apparatus including means for forming a 24 bit frame; means for forming a signalling byte containing seven bits of signalling data; means for generating a control bit wherein the control bit is a 1 responsive to the information byte containing character information, and the control bit is a 0 responsive to the information byte containing no character information; means for providing a control bit of 0 responsive to the information byte containing additional status information.

The means for forming the data frame having means for generating a first start bit responsive to the beginning of the frame, means for generating a signalling byte, having seven bits of data which define the status of the terminal, means for generating a control bit responsive to the content of the information byte, means for generating a first set of two stop bits responsive to the end of the signalling byte and the control bit, means for generating a second start bit responsive to the beginning of the information byte and means for generating a second set of stop bits responsive to the end of the data frame.

In preferred embodiments, the telecommunications exchange reserves specific digital codes for internal processing, and has means for detecting when the digital data is identical to the digital code reserved by the exchange for internal processing; means for converting the identical digital data to substitute data, means for transmitting the substitute data to the exchange in place of the identical digital data, and means for converting the substitute data transmitted by the exchange to the identical digital data; a predetermined value of the control bit is transmitted with a predetermined information byte whenever the digital data transmitted is identical to the synchronizing data; the control bit is 0 and the information byte is 1 0 1 1 1 1 1 1.

In another aspect, the invention features apparatus for transmitting digital data between terminals with a telecommunications exchange which reserves specific digital codes for internal processing, having means for detecting when the digital data is identical to the digital code reserved by the exchange for internal processing, means for converting the identical digital data to substitute data, means for transmitting the substitute data to the exchange in place of the identical digital data and means for converting the substitute data transmitted by the exchange to the identical digital data.

In preferred embodiments, the exchange uses internal synchronizing data, and said digital data is converted to the substitute data whenever the digital data is identical with the synchronizing data; the synchronizing byte is represented by 1 0 0 0 0 0 0 0.

This invention allows most conventional computer terminals connected to a telephone switch to communicate with any other terminal connected to the switch. Data conversion of character information communicated between terminals, due to the reservation of certain character codes by the switch for internal use, occurs outside of and without the knowledge of either the terminals or the switch. This allows a telephone switch in a private automatic branch exchange to be used without modification for handling telephone traffic and data transfer between terminals.

Other features and advantages of the invention will be apparent from the following detailed description, and from the claims.

For a full understanding of the present invention, reference should now be made to the following detailed description of the invention and to the accompanying drawings.

DETAILED DESCRIPTION

An embodiment of the invention will now be described with reference to the drawings.

Figure 1:
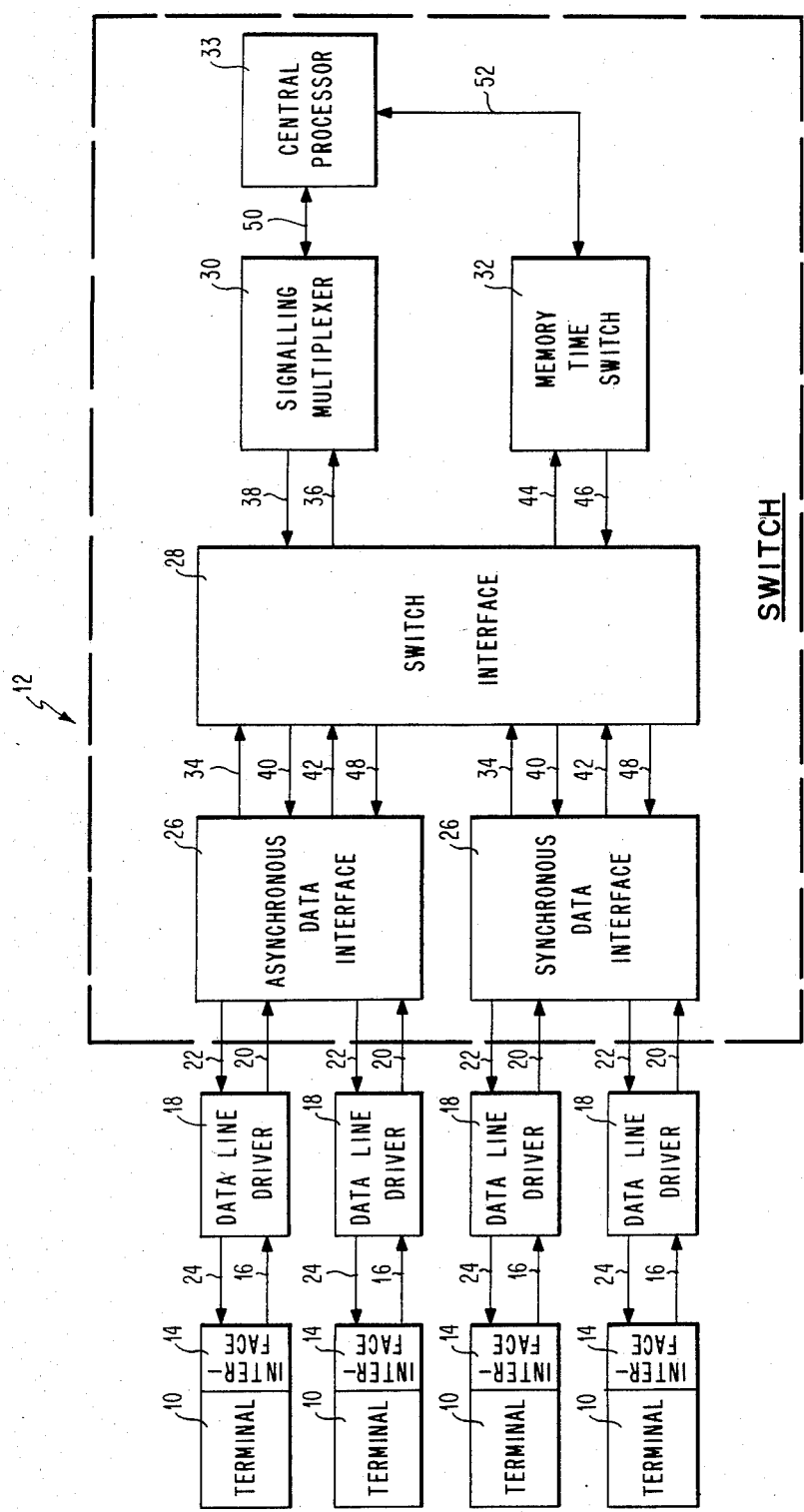
FIG. 1 is a diagrammatic view of data terminals which communicate via a telecommunications exchange.

Referring to FIG. 1, stand alone data terminals 10 can communicate with each other via digital telephone switch 12.

Terminal 10 can be any conventional computer terminal with an EIA RS232 interface, communications capability and a data rate of not more than 19.2 KPBS.

Switch 12 can be a "Saturn III" switch which is sold in the United States by Siemens Communication Systems, Inc., for use in a private automatic branch exchange.

Each terminal incorporates a standard EIA RS232 interface 14, which allows asynchronous data to be transmitted to and received from the telephone switch. Data is carried via bus 16 from the terminal to a data line driver 18, and then via wire pair 20 to the switch. Data is carried via wire pair 22 from the switch to a data line driver, and then to the terminal via bus 24.

Asynchronous data interfaces 26 provide input and output ports for communication of data between terminals via switch 12. Interface 26 receives asynchronous data from the terminal, via a data line driver, and it converts that data to synchronous data for routing within the switch. Interface 26 also converts synchronous data used in the switch to asynchronous data which is sent to a data line driver via a wire pair 22.

Telephone switch 12 includes a switch interface 28 which couples asynchronous data interfaces 26 with the signalling multiplexer 30 and memory time switch 32, which directs information within the switch which is to be transmitted from terminal to terminal via switch 12.

The signalling multiplexer directs command and status information between the central processor 33 and the input and output of each asynchronous data interface.

The signalling multiplexer input is transmitted from the asynchronous data interface to the switch interface 28, via input line 34, and from the switch interface to the signalling multiplexer via input line 36.

The signalling multiplexer output is transmitted via output line 38 to the switch interface, and from the switch interface to the asynchronous data interface via output line 40.

The memory time switch input is transmitted from the asynchronous data interface to the switch interface via input line 42, and from the switch interface to the memory time switch via input line 44.

The memory time switch output is transmitted via output line 46 to the switch interface, and from the switch interface to the asynchronous data interface via output line 48.

The signalling multiplexer and the memory time switch are connected to the switch's central processor via buses 50, 52 respectively.

Figure 2:
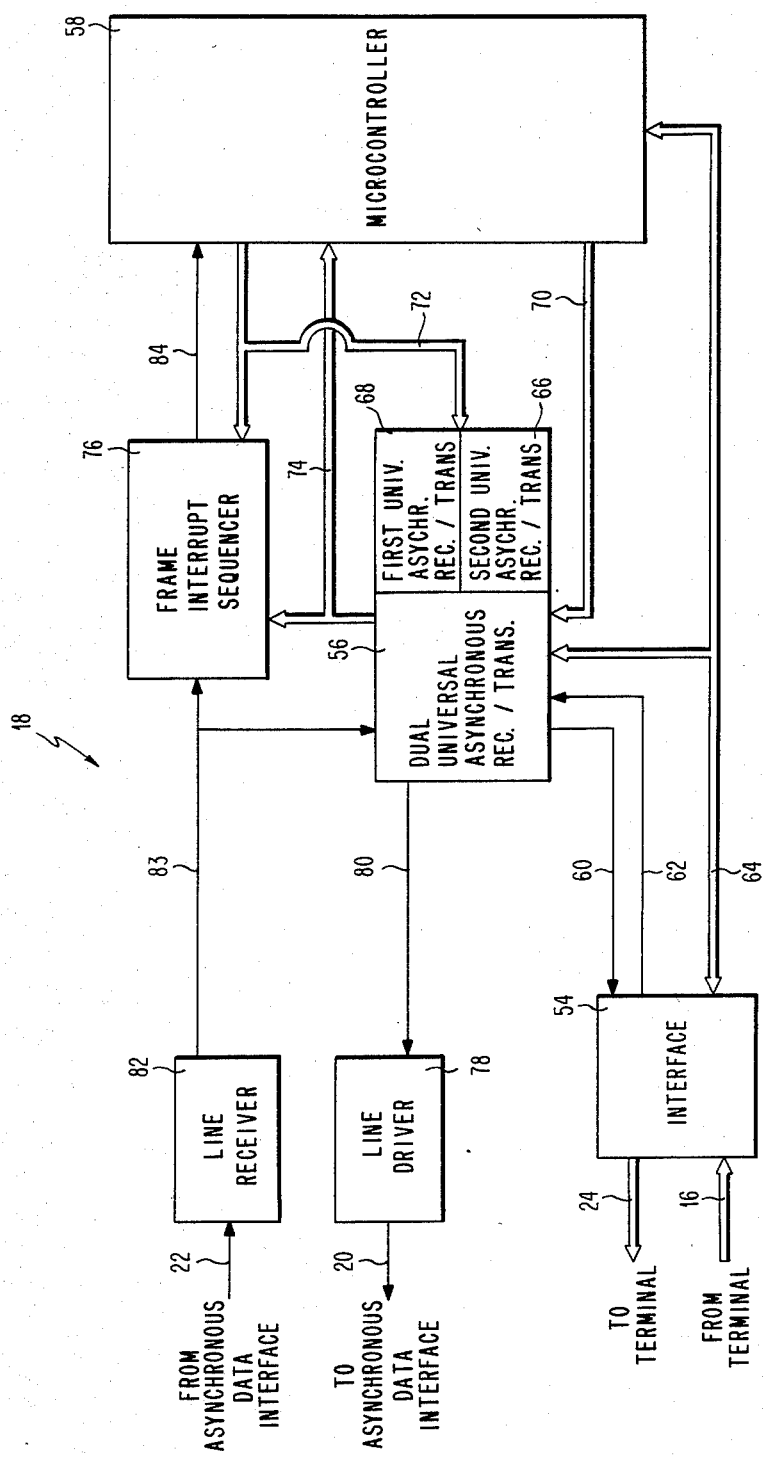
FIG. 2 is a detailed diagrammatic view of the data line drivers shown in FIG. 1.

Referring to FIG. 2, a data line driver 18 is shown in more detail.

A standard EIA RS232 interface 54 provides an interface between buses 16 and 24 and the data line driver. The interface, which is connected to dual universal asynchronous receiver/transmitter 56 and to microcontroller 58 via wires 60, 62, 64, directs serial data from bus 16 to receiver/transmitter 56.

The dual universal asynchronous receiver/transmitter, which includes a first universal asynchronous receiver/transmitter 66 and second universal asynchronous receiver/transmitter 68, is connected to the microcontroller via buses 64, 70, 72, 74, and to the frame interrupt sequencer 76, via buses 72, 74.

The first universal asynchronous receiver/transmitter transforms serial asynchronous data from the terminal into parallel asynchronous data, which is directed to the microcontroller.

Terminal data received from a data line driver is transmitted by conventional line driver 78, connected to dual universal asynchronous receiver/transmitter 56 via line 80, to the telephone switch via wire pair 20.

Data from the switch is received by a convential line receiver 82, via line pair 22. Line receiver 82 directs data from the switch to dual universal asynchronous receiver/transmitter 56, via line 83. Second universal asynchronous receiver/transmitter 68 transforms serial data from the telephone switch into parallel data which is directed to the microcontroller.

Data from the switch is transmitted from interface 54 to a data terminal via bus 24.

The microcontroller, which consists of an Intel 8039 microprocessor with associated memory, controls operation of the data line driver.

Frame interrupt sequencer 76 is a state machine, connected to dual universal asynchronous receiver/transmitter 56 and to microcontroller 58 via buses 72, 74, 84. It detects frame boundaries and provides interrupts between frames so the microcontroller knows where each frame begins and ends.

Dual asynchronous receiver/transmitter 56 is typically an SCN 2681 made by Signetics.

Line receiver 82 is typically a 26LS33 made by Advanced Micro Devices.

Line driver 78 is typically a 26LS31 made by Advanced Micro Devices.

Frame interrupt sequencer 76 is a state machine which can be comprised of a programmable read only memory (typically a 6309 PROM made by Monolithic Memories, Inc.) and a register (typically an SN74LS273 made by Texas Instruments).

Figure 3:
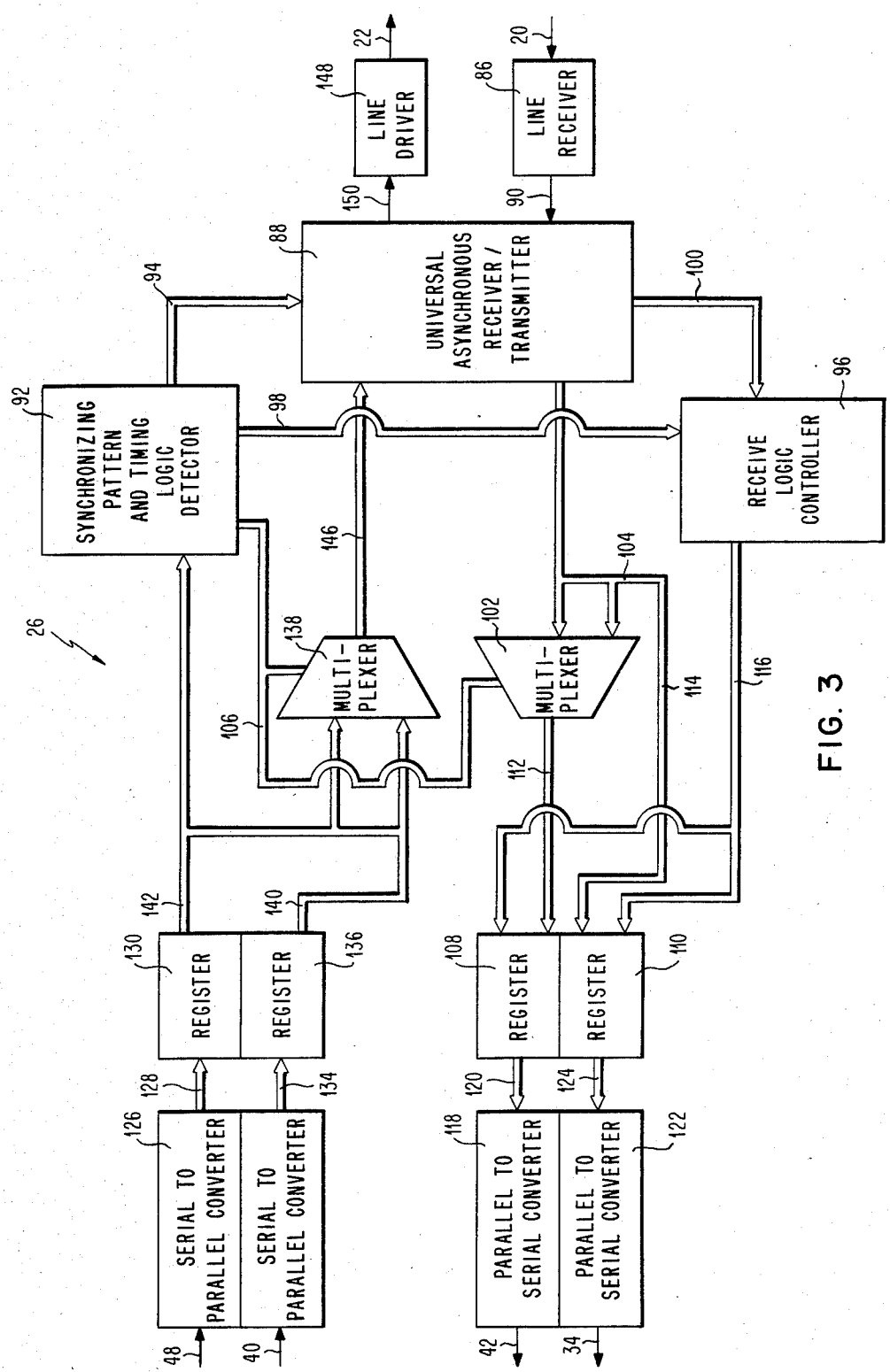
FIG. 3 is a detailed diagrammatic view of the asynchronous data interfaces shown in FIG. 1.

Referring to FIG. 3, an asynchronous data interface 26 of switch 12 is shown in more detail.

Serial asynchronous data transmitted from data line driver 18 is received by line receiver 86, via wire pair 20, and delivered to universal asynchronous receiver/transmitter 88, via line 90. Receiver/transmitter 88 converts the incoming data to synchronous data.

Receive logic controller 96, connected to receiver/transmitter 88 via line 100, detects the beginning of each data frame so that a synchronizing byte can be added to each frame.

Receive logic controller 96, connected to detector 92 via bus 98 and to receiver/transmitter 88 via bus 100, directs incoming data from the receiver/transmitter to memory time switch 32 or to signalling multiplexer 30, which are both shown in FIG. 1.

Multiplexer 102, connected to receiver/transmitter 88 via bus 104 and to detector 92 via bus 106, arranges data in a three byte frame format for transmission to the memory time switch.

Registers 108, 110 hold information coming from multiplex 102 until it can be sent out to preserve timing. These registers are connected to multiplexer 102 via buses 112, 104, and to the receive logic controller via bus 116.

Parallel to serial converter 118 receives parallel data from register 108, via bus 120, and converts it to serial data which is sent to the memory time switch via input line 42.

Parallel to serial converter 122 receives parallel data from register 110, via bus 124, and converts it to serial data which is sent to the signalling multiplexer via input line 34.

The memory time switch output is provided to serial to parallel converter 126, via output line 48, which converts the data to parallel data transmitted via bus 128 to register 130.

The signalling multiplexer output is provided to converter 132, via output line 40, which converts the data to parallel data transmitted, via bus 134, to register 136.

Registers 130, 136, which operate in the same manner as previously described registers 108, 110, are connected to multiplexer 138, via buses 140, 142, and to detector 92, via bus 142.

Multiplexer 138, connected to multiplexer 102 and detector 92, via bus 106, and to receiver/transmitter 88, via bus 146, arranges data receive from registers 130, 136 which is sent to receiver/transmitter 88.

Detector 92 locates the beginning of each three byte frame to provide timing for receiver/transmitter 88 and receive logic controller 96.

Data from multiplexer 138, which is received by the universal asynchronous receiver/transmitter is formatted into a 24 bit frame and directed to line driver 148, via line 150, which transmitts the data to data line driver 18 via wire pair 20.

The operation will now be described in detail with reference to FIGS. 1-7.

Terminal 10 transmitts character information in the form of asynchronous data to and receives asynchronous data from a data line driver at approximately 19.2 KBPS.

Data from the terminal is placed in a 24 bit data frame 152 (shown is FIG. 4) by the data line driver. First bit 154 is a start bit designated 0, which indicates the beginning of the data frame. The next seven bits represent signalling data 156 which describes the terminal status. This is followed by control bit 158 which will be 0 to 1 depending upon whether or not the frame contains information from the terminal which is to be communicated to another terminal.

The control bit is followed by two stop bits 160 which are 1's and which indicate the end of the signalling and control data. The next bit, another start bit 154, which is 0, indicates that the following eight bits define information byte 162 which may contain data to be transmitted from terminal to terminal. The final four bits are stop bits 164 which are 1's. These stop bits indicate the end of the data frame and by design a different number are used following the control bit to enable the switch to distinguish between the signalling and control data and the end of the data frame.

The control bit will normally be a 1 when information to be transmitted between terminals is contained in the information byte. When the information byte does not contain information to be transmitted between the terminals the control bit will be a 0 and the information byte will contain data pertaining to interface 14. This interface data can be link commands which are sent between data line drivers via a data path called a data link, or status information describing the state of the interface.

However, an information byte can not contain data to be transmitted which is represented by 1 0 0 0 0 0 0 0 because an identical byte, generated by asynchronous data interface 26, is used by the switch as an internal synchronizing byte. Therefore, whenever the terminal transmitts an information byte identical to the synchronizing byte the data line driver substitutes 1 0 1 1 1 1 1 1 and sets the control bit to 0. This conversion occurs in the data line driver without the knowledge of either the terminal or the switch.

The data line driver microcontroller 58 (shown in FIG. 2), controls both the formation of data frame 152, and the conversion of information byte 162, when it is identical to the synchronizing byte, into substitute byte 1 0 1 1 1 1 1 1.

Figure 6:
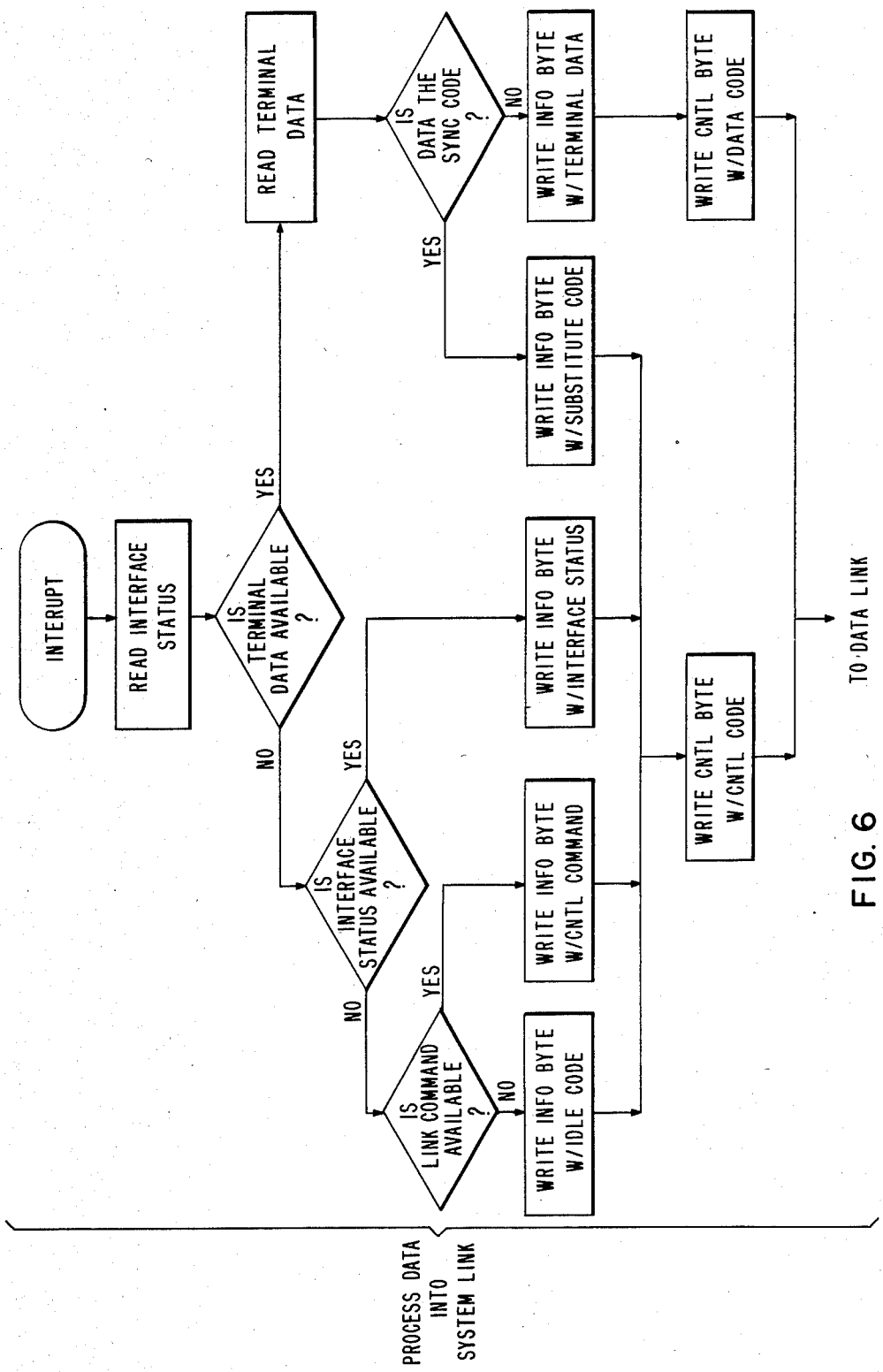
FIG. 6 is a flow chart of the detection and conversion of information data identical to internal switch synchronizing data which is converted to substitute data by a data line driver.
Figure 7:
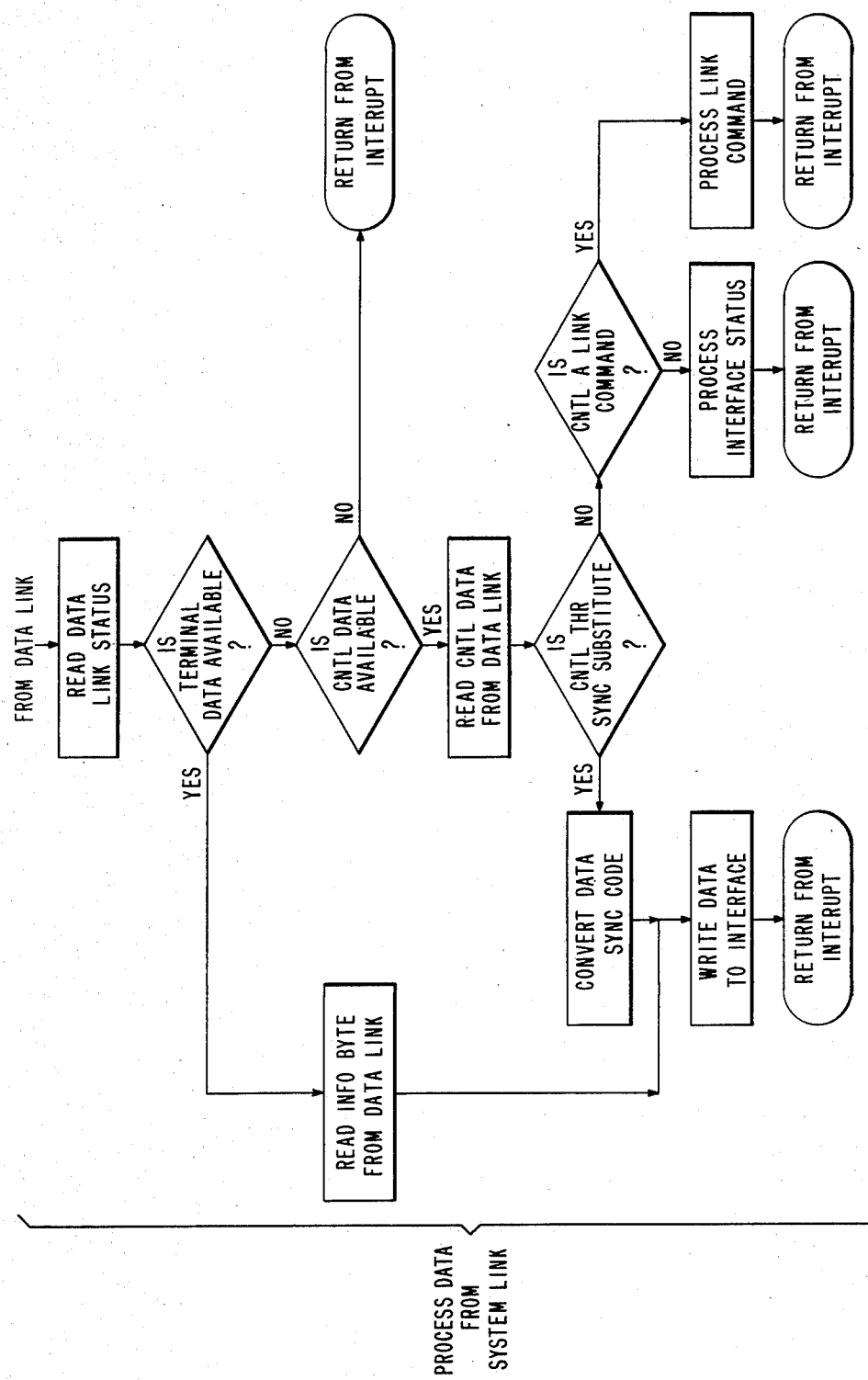
FIG. 7 is a flow chart of the detection and conversion of substitute data back to information data by a data line driver.

The software utilized for the detection and conversion of an information byte identical to the synchronizing byte is shown diagrammatically by the flow chart in FIG. 6.

The data line driver transmitts the above described data frames over wire pair 20 to the data interface of the switch at approximatley 64 KBPS.

However, if the data line driver operates at slightly less than 64 KBPS, the number of bits in the final group of stop bits may be corresponding reduced. This second group of stop bits will act as a time buffer between data frames.

Figure 5:
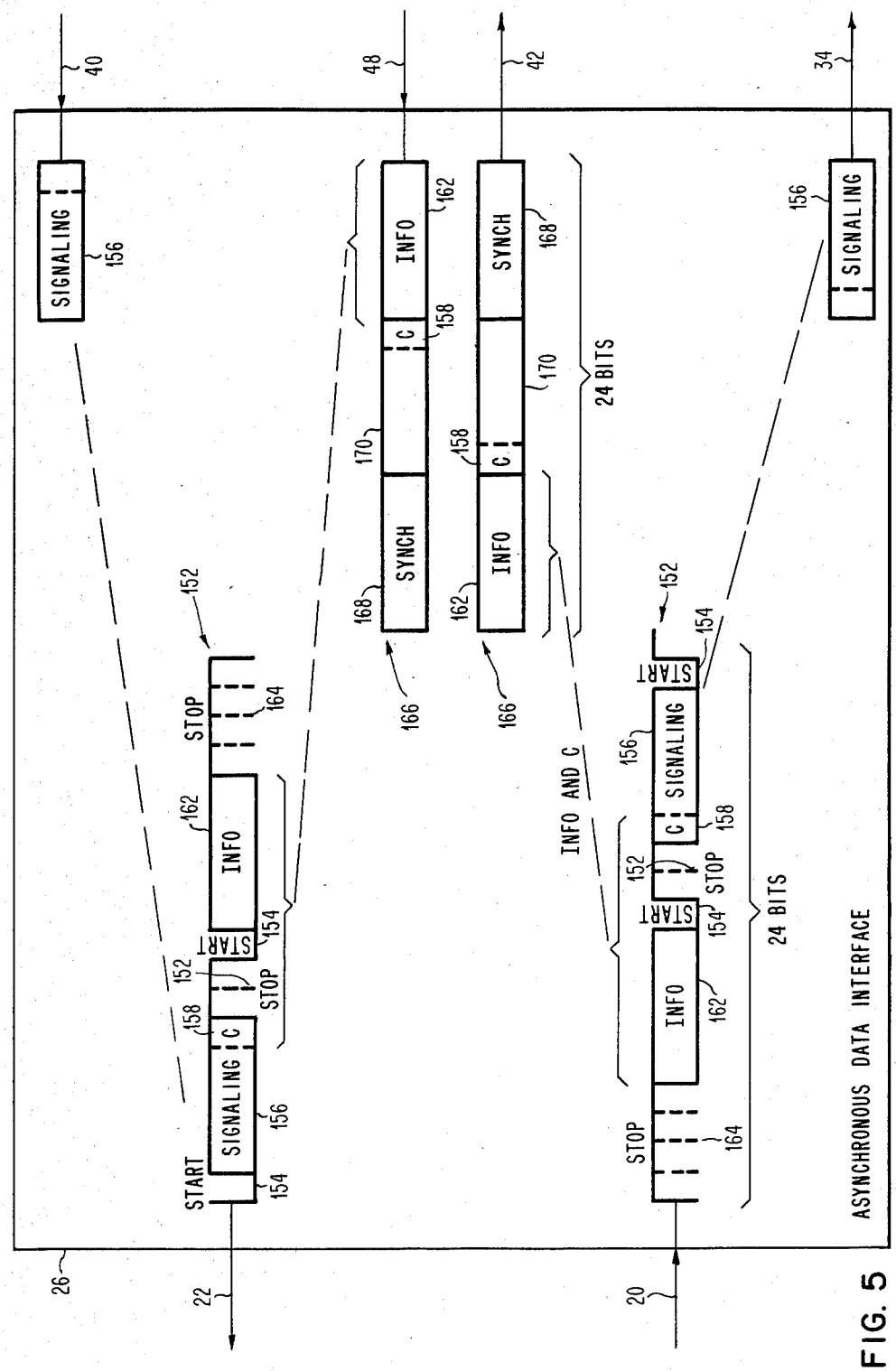
FIG. 5 is a diagram of the frame formatting used in the asynchronous data interface shown in FIG. 1.

Referring to FIG. 5, asynchronous data received by asynchronous data interface 26 is divided into signalling data 156 and a combination of control bit 158 and information byte 162.

The signalling data, consisting of 7 bits is transmitted by interface 26, through interface 40, to the signalling multiplexer via inputs 34 and 36 respectively.

Data combination 158, 162 is placed in 24 bit memory time switch data frame 166, which also includes eight bit synchronizing byte 168 and byte 170. Byte 170 consists of seven bits representative of other data which can be transmitted within the switch.

The memory time switch data, now in the form of data frame 166, is transmitted via input 42 to interface 40 and then to the memory time switch via input 44.

Referring to FIG. 3, the separating of data frame 152 and the creation of memory time switch data frame 166, by asynchronous data interface 26, will now be described in more detail.

Asynchronous data in the form of data frame 152 (shown in FIG. 4), is received by line receiver 86, via wire pair 22, and sent via bus 90 to receiver/transmitter 88 which converts the data to parallel data.

Receive logic controller 96, directs the signalling portion of the incoming data to register 110 and then, via bus 124, to converter 122 which converts it from parallel to serial data, and transmitts it to the signalling multiplexer.

Controller 96 also directs the information byte and the control bit to multiplexer 102, which provides the memory time switch data formatting already discussed. The memory time switch data frame is transmitted to register 108, and then, via bus 120, to converter 118, which converts the data from parallel to serial data and transmitts it to the memory time switch.

Data sent to the memory time switch is transmitted, via output 46, to switch interface 28, and then via output 48 to asynchronous data interface 26, which transmitts the information to the appropriate data line driver so that the intended terminal receives the data.

The serial data received by converter 126 from the memory time switch is converted to parallel data and transmitted to register 130, via bus 128. Register 130 holds data temporarily to preserve timing. Detector 92 detects the synchronizing byte to determine the beginning of each data frame 152 (shown in FIG. 4).

Signalling data sent from the signalling multiplexer, via output 38, is delivered by interface 28 (shown in FIG. 1) to the appropriate asynchronous data interface, via output 40.

The serial signalling data received by converter 132 is converted to parallel data and transmitted, via bus 134, to register 136. Register 136 performs the same function as register 130.

Figure 4:
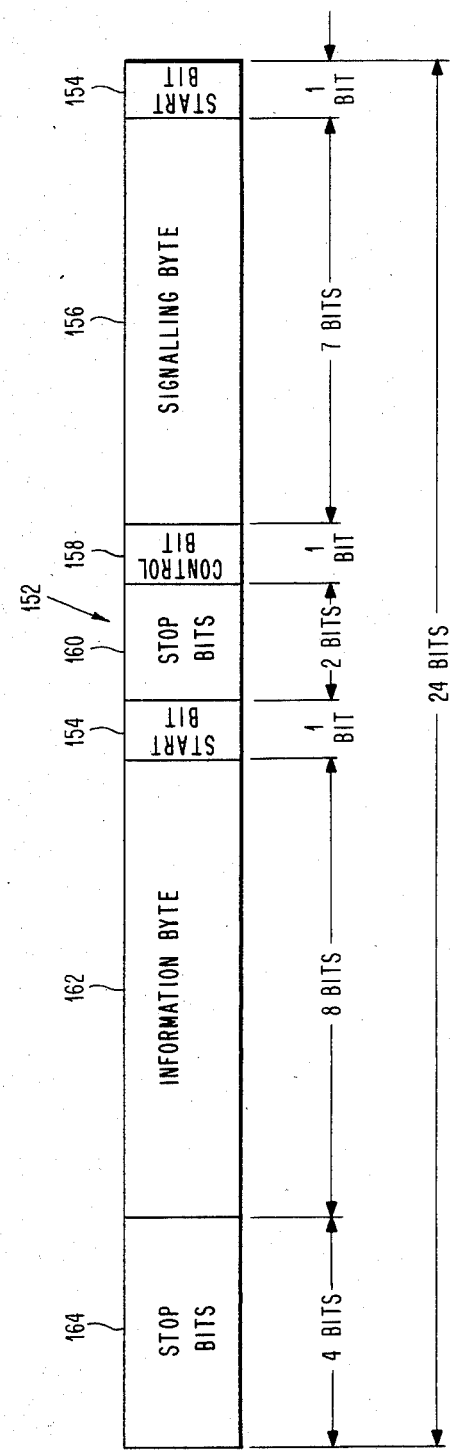
FIG. 4 is a diagram of the frame formatting used in the data line driver shown in FIG. 1.

Signalling data on bus 140, control data on bus 142 and information bytes on bus 142 are multiplexed by multiplexer 138 into data frame format 152 (shown in FIG. 4). This data is sent to receiver/transmitter 88 which adds stop and start bits to convert the data from parallel, synchronous data to serial, asynchronous data. This asynchronous data is then sent to line driver 140 which transmitts the data to the appropriate data line driver, via wire pair 22.

Referring to FIG. 2, the data received by line receiver 82, via wire pair 22, is transmitted to second universal asynchronous receiver/transmitter 68 which converts the data from serial to parallel data and then directs it to microcontroller 58. Frame interrupt sequencer 76 detects data frame boundaries and provides interrupts between frames so the microcontroller knows where each frame begins.

The microcontroller determines if a data frame contains both a control bit equal to 0 and an information byte of 1 0 1 1 1 1 1 1. If this combination is detected the microcontroller sets the control bit to 1 and converts the information byte to 1 0 0 0 0 0 0 0. This detection and conversion is shown by the flow chart in FIG. 7.

The data line driver then transmitts the data to the appropriate terminal via bus 24.

Neither the switch nor the receiving terminal are aware of any conversions performed by the data line driver.

There has thus been shown and described a novel method and apparatus for transmitting data which fulfills all the objects and advantages sought therefore. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. The method of transmitting digital data between terminals with a telecommunications exchange which reserves specific digital codes for internal processing, comprising the steps of:

(a) forming a data frame containing a control code and an information code, said control code having a first state when said information code contains digital data to be transmitted and having a second state when said information code does not contain digital data;
  (b) detecting when an item of said digital data is identical to said digital code reserved by said exchange for internal processing;
  (c) if said item of digital data is not identical to said reserved digital code, setting said control code to said first state and setting said information code equal to said item of digital data;
  (d) if said item of digital data is identical to said reserved digital code, converting said identical digital data to prescribed substitute digital data;
  (e) if said item of digital data is identical to said reserved digital code, setting said control code to said second state and setting said information code to said prescribed substitute digital data;
  (f) transmitting said data frame to said exchange;
  (g) receiving said data frame from said exchange; and
  (h) if said control code is in said second state, converting said substitute data transmitted in said data frame to said identical digital data.

2. The method of claim 1 wherein said exchange uses internal synchronizing data, and said digital data is converted to said substitute data whenever said digital data is identical with said synchronizing data.

3. The method of claim 2 wherein said synchronizing data is represented by 1 0 0 0 0 0 0 0.

* * * * *